United States Patent
Wang et al.

(10) Patent No.: US 9,958,725 B2
(45) Date of Patent: May 1, 2018

(54) LIQUID CRYSTAL DISPLAY PANEL AND MANUFACTURING METHOD THEREOF AND MOTHERBOARD OF LIQUID CRYSTAL DISPLAY PANEL

(71) Applicants: BOE Technology Group Co., Ltd., Beijing (CN); Hefei BOE Optoelectronics Technology Co., Ltd., Anhui (CN)

(72) Inventors: Hui Wang, Beijing (CN); Chun Wang, Beijing (CN); Junsheng Chen, Beijing (CN); Xiaohe Li, Beijing (CN); Chuncheng Che, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 71 days.

(21) Appl. No.: 15/097,496

(22) Filed: Apr. 13, 2016

(65) Prior Publication Data
US 2017/0059929 A1    Mar. 2, 2017

(30) Foreign Application Priority Data
Aug. 26, 2015   (CN) .......................... 2015 1 0531693

(51) Int. Cl.
*G02F 1/1335* (2006.01)
*G02F 1/1339* (2006.01)
(Continued)

(52) U.S. Cl.
CPC ...... *G02F 1/133514* (2013.01); *G02F 1/1339* (2013.01); *G02F 1/13439* (2013.01);
(Continued)

(58) Field of Classification Search
None
See application file for complete search history.

(56) References Cited

U.S. PATENT DOCUMENTS

2007/0025705 A1*   2/2007   Yoon ................. G02F 1/133351
                                                                    386/201
2008/0136993 A1    6/2008   Jeong et al.
(Continued)

FOREIGN PATENT DOCUMENTS

| CN | 1734316 A | 2/2006 |
|---|---|---|
| CN | 1896812 A | 1/2007 |

(Continued)

OTHER PUBLICATIONS

Nov. 1, 2017—(CN) First Office Action Appn 201510531693.1 with English Tran.

Primary Examiner — Ryan Crockett
(74) Attorney, Agent, or Firm — Banner & Witcoff, Ltd.

(57) ABSTRACT

A liquid crystal display panel and a manufacturing method thereof, and a motherboard of a liquid crystal display panel are provided. According to the embodiments of the present disclosure, in one aspect, identification patterns are formed in different unit display panel regions of the same exposure region of a motherboard of an array substrate by designing a mask of the array substrate of a liquid crystal display panel, to distinguish the unit display panels exposed in the same batch; in another aspect, the unit display panels exposed in different batches are distinguished through the arrangement modes of the color filters in the unit display panel regions of a motherboard of a color filter substrate, to realize marking of all unit display panels on a same motherboard glass.

10 Claims, 7 Drawing Sheets

FIG. 3

(51) Int. Cl.
*G02F 1/1343* (2006.01)
*G02F 1/1333* (2006.01)

(52) U.S. Cl.
CPC ............... *G02F 1/133516* (2013.01); *G02F 2001/133354* (2013.01)

(56) References Cited

U.S. PATENT DOCUMENTS

| | | | | |
|---|---|---|---|---|
| 2013/0214337 A1* | 8/2013 | Kashihara | ........... | H01L 27/1464 257/294 |
| 2016/0011456 A1* | 1/2016 | Wang | ................ | G02F 1/133351 359/891 |
| 2016/0327707 A1* | 11/2016 | Wang | ..................... | G02B 5/201 |

FOREIGN PATENT DOCUMENTS

| CN | 101179011 A | 5/2008 |
|---|---|---|
| CN | 101699337 A | 4/2010 |
| KR | 20050068510 A | 7/2005 |

\* cited by examiner

LIQUID CRYSTAL DISPLAY PANEL AND MANUFACTURING METHOD THEREOF AND MOTHERBOARD OF LIQUID CRYSTAL DISPLAY PANEL

This application claims priority to and the benefit of Chinese Patent Application No. 201510531693.1 filed on Aug. 26, 2015, which application is incorporated herein in its entirety.

TECHNICAL FIELD

Embodiments of the present disclosure relate to a liquid crystal display panel, and a manufacturing method thereof, and a motherboard of a liquid crystal display panel.

BACKGROUND

In a technical field of display, liquid crystal display panels are widely used in modern digital information devices due to advantages such as small size, low power consumption, no radiation and high resolution and so on.

For panel manufacturers, the more unit display panels segmented from one motherboard glass, the higher the profitability of the product line is. A panel identification (ID) is manufactured on each unit display panel during the manufacturing process to distinguish each unit display panel. As different unit display panels have different panel identifications, a laser pen is used to mark each unit display panel sequentially in the product line. When there is a small amount of unit display panels on one motherboard glass, the marking of panel identifications is relatively simple, and occupies less productive capacity of the product line. But when there are a large amount of unit display panels on one motherboard glass, the marking of panel identifications is trivial, and occupies more productive capacity of the product line, especially when currently the size of unit display panels made of each generation of panel manufacturing is smaller and smaller, and there are hundreds of unit display panels on one substrate of the motherboard glass, the marking of panel identifications is troublesome. Sometimes, the marking of panel identifications is not performed for the sake of productive capacity of the product line. Consequently, problems arising in a later fabrication procedure fail to be traced back to a previous procedure, significantly reducing efficiency of the product line. On the other hand, a peripheral region of a small-sized display panel becomes smaller and smaller, and panel identifications per se will occupy certain space, so it is needed to explore a method for marking panel identifications of a small-sized display panel.

SUMMARY

Some embodiments according to the present invention provide a method for manufacturing a liquid crystal display panel, comprising:

preparing a first base substrate, the first base substrate being divided into a plurality of first regions, each first region including a plurality of first sub-regions for manufacturing an array substrate of a unit display panel, each first sub-region including a display region and a peripheral region located a periphery of the display region; forming a film pattern layer in each first region of the first base substrate by a patterning process with a mask, to form a motherboard of an array substrate, the film pattern layer including identification patterns located in the peripheral regions of the first sub-regions, and the identification patterns being configured to distinguish the plurality of sub-regions of each first region;

preparing a second base substrate, the second base substrate being divided into a plurality of second regions corresponding to the plurality of first regions of the first base substrate, each second region including a plurality of second sub-regions corresponding to the plurality of first sub-regions, each second sub-region including a display region corresponding to the display region of the first sub-region; forming an array of color filters in different colors in each second region to form a motherboard of a color filter substrate, such that color filters in the display regions of the second sub-regions in different second regions have different arrangement modes, and color filters in the display regions of the plurality of sub-regions of a same second region have a same arrangement mode; and cell-assembling the motherboard of the array substrate with the motherboard of the color filter substrate, such that the display regions of the first sub-regions on the motherboard of the array substrate align with the display regions of the second sub-regions on the motherboard of the color filter substrate in a direction perpendicular to the first base substrate or to the second base substrate.

In some examples, the first region and the second region are exposure regions capable of being covered by a single exposure process.

In some examples, forming the film pattern layer in each first region of the first base substrate by the patterning process with the mask includes: patterning with different masks to form a plurality of thin film pattern layers sequentially, the identification patterns being included in one of the plurality of thin film pattern layers.

In some examples, the plurality of thin film pattern layers include a gate electrode pattern layer and a source-drain electrode pattern layer, the identification patterns are included in one of the gate electrode pattern layer and the source-drain electrode pattern layer.

In some examples, the array of color filters in different colors includes red color filters, green color filters, and blue color filters, and arrangement sequences of the red color filters, the green color filters and the blue color filters in each row of the array are different in different second regions.

In some examples, in the step of manufacturing color filters in different colors, the color filters in different colors are formed by patterning processes with a same mask, and relative positions in corresponding second regions of masks for forming color filters in at least one color are different in different second regions, such that arrangement sequences of the red color filters, the green color filters and the blue color filters in each row of the array of color filters are different in different second regions.

In some examples, cell-assembling the motherboard of the array substrate with the motherboard of the color filter substrate includes arranging sealant between the motherboard of the array substrate and the motherboard of the color filter substrate, and the sealant surrounding the first sub-regions and the second sub-regions.

In some examples, the method for manufacturing a liquid crystal display panel further comprises dividing the first sub-regions of the motherboard of the array substrate and the second sub-regions of the motherboard of the color filter substrate which are cell-assembled, to form the unit display panels.

In some examples, the method for manufacturing a liquid crystal display panel further comprises applying a liquid crystal material between the motherboard of the array substrate and the motherboard of the color filter substrate.

In some examples, each of the identification patterns is arranged in a rectangular region of 1 square millimeter.

Some embodiments according to the present invention provide a motherboard of a liquid crystal display panel, comprising a motherboard of an array substrate and a motherboard of a color filter substrate which are cell-assembled with each other, and a liquid crystal material located between the motherboard of the array substrate and the motherboard of the color filter substrate, wherein, the motherboard of the liquid crystal display panel comprises a plurality of first regions, each first region including a plurality of unit display panel regions, the unit display panel region including a display region and a peripheral region, the motherboard of the array substrate includes identification patterns arranged in the peripheral region of each unit display panel region, the identification patterns being configured to distinguish the plurality of unit display panel regions in each first region, the motherboard of the color filter substrate includes an array of color filters in different colors, color filters located in different first regions have different arrangement modes, and color filters in the unit display panel region in a same first region have a same arrangement mode.

In some examples, the motherboard of the array substrate includes a plurality of thin film pattern layers, and the identification patterns are arranged in one of the plurality of thin film pattern layers.

In some examples, the plurality of thin film pattern layers include a gate electrode pattern layer and a source-drain electrode pattern layer, and the identification patterns are included in one of the gate electrode pattern layer and the source-drain electrode pattern layer.

In some examples, the array of color filters in different colors includes red color filters, green color filters, and blue color filters, and arrangement sequences of the red color filters, the green color filters and the blue color filters in each row of the array of color filters are different in different first regions.

In some examples, sealant is arranged between the motherboard of the array substrate and the motherboard of the color filter substrate, and the sealant surrounds the display regions of the unit display panel regions.

In some examples, a liquid crystal material is located in the display regions surrounded by the sealant between the motherboard of the array substrate and the motherboard of the color filter substrate.

In some examples, each of the identification patterns is arranged in a rectangular region of 1 square millimeter.

Some embodiments according to the present invention provide a liquid crystal display panel, comprising an array substrate and a color filter substrate which are cell-assembled with each other, and a liquid crystal material arranged between the array substrate and the color filter substrate, wherein, the liquid crystal display panel comprises a display region and a peripheral region surrounding the display region; the array substrate comprises an identification pattern arranged in the peripheral region.

In some examples, the array substrate includes a plurality of thin film pattern layers, and the identification pattern is arranged in one of the plurality of thin film pattern layers.

In some examples, the plurality of thin film pattern layers include a gate electrode pattern layer and a source-drain electrode pattern layer, and the identification patterns are included in one of the gate electrode pattern layer and the source-drain electrode pattern layer.

In some examples, the identification pattern is arranged in a rectangular region of 1 square millimeter.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, the technical or scientific terms used herein should have common meanings as understood by those ordinarily skilled in the field to which the present disclosure belongs. Words such as "first", "second" and the like used in the description and claims of the present disclosure do not represent any order, quantity or importance, but rather are used to distinguish different components. Similarly, words such as "a" or "an" or the like do not represent quantitative limitation, but rather indicate there is at least one.

Generally a liquid crystal display panel includes an array substrate and a color filter substrate that face each other, and a liquid crystal material is arranged in a liquid crystal cell formed between the array substrate and the color filter substrate. The array substrate and the color filter substrate can be manufactured separately, for example, the array substrate and the color filter substrate are manufactured on a first base substrate (e.g., a glass substrate) and a second base substrate (e.g., a glass substrate) respectively. The array substrate refers to a substrate on which thin film transistors and pixel electrodes are disposed in array and signal gate lines, data lines and so on are applied. The color filter substrate refers to a substrate on which color filters in different colors corresponding to respective pixel regions on the array substrate are formed, and light passing through pixels can present different colors through respective color filters, so as to enable color display. For example, the color filter substrate can comprise black matrices (BM), color filters and protective layers and so on formed on the substrate.

Manufacturing the array substrate and the color filter substrate is implemented by manufacturing various film patterns on a large-area motherboard glass (base substrate), then cutting it into unit display panels. As a manufacturing technology of liquid crystal panels develops, the motherboard glass for manufacturing the liquid crystal panels becomes larger and larger. Thus, it is possible to segment a plurality of unit display panels on one motherboard of a liquid crystal panel. For example, a substrate size at a highest stage of the fifth generation (G5) line is 1200 mm×1300 mm, while a substrate size of the eighth generation (G8) line is up to 2160 mm×2460 mm. To prepare various thin film patterns on such large substrates, it is impossible to perform single exposure on a whole substrate for patterning exposure process, but exposure is conducted in batches in several regions on one substrate according to conditions of exposure process. Here, a region that can be covered by single exposure on the substrate is called an exposure region. In addition, each exposure region can also includes regions corresponding to a plurality of unit display panels to be formed, and these regions can be called as unit regions of the array substrate on the motherboard of the array substrate, while called as unit regions of the color filter substrate on the motherboard of the color filter substrate. Each unit display panel region can also include a display region and a peripheral region surrounding the display region, then the unit regions of the array substrate on the motherboard of the array substrate and the unit regions of the color filter substrate on the motherboard of the color filter substrate also include corresponding regions. Therefore, it is needed to mark the plurality of unit display panels cut from the manufactured motherboard of the liquid crystal panel to distinguish certain unit display panels in certain exposure processes (i.e., in certain exposure regions).

The embodiments of the present disclosure involve the problem of marking the unit display panels. In one aspect, the unit display panels exposed in a same batch are distinguished by designing a mask of the array substrate of the liquid crystal display panel; in another aspect, the display panels exposed in different batches are distinguished by setting color filters at a side of the color filter in the unit display panel based on a precondition of guaranteeing the function of color resistance of color filter, thereby implementing marking the panel identifications of all the unit display panels on the same motherboard glass. The embodiments according to the present disclosure can solve the problem that currently the marking process of panel identifications influences the productive capacity of the product line, and also can solve a problem that the panel identifications occupy large peripheral space of the display panel. Through simple process design and modification, the embodiments according to the present disclosure can effectively improve the productive capacity of the product line, and in the meantime optimize a design space of the peripheral region of the display panel.

A description in further detail is given for one embodiment of the present disclosure. According to some embodiments of the present disclosure, the method for manufacturing a motherboard of a liquid crystal display panel includes steps of:

preparing a first base substrate, the first base substrate including a plurality of first exposure regions, each first exposure region including a plurality of unit regions of the array substrate, each unit region of the array substrate including a display region and a peripheral region surrounding the display region; forming a film pattern layer in each first exposure region of the first base substrate by a patterning process with a mask, to form the motherboard of the array substrate, the film pattern layer including identification patterns located in the peripheral regions of the unit regions of the array substrate, and the identification patterns being configured to distinguish the plurality of unit regions of the array substrate in each exposure region;

preparing a second base substrate, the second base substrate including a plurality of second exposure regions corresponding to the plurality of first exposure regions of the first base substrate, each second exposure region including a plurality of unit regions of the color filter substrate corresponding to the plurality of unit regions of the array substrate, each unit region of the color filter substrate including a display region corresponding to the display region in the unit region of the array substrate; forming an array of color filters in different colors in each second exposure region, to form a motherboard of a color filter substrate, such that color filters in the display regions corresponding to the unit regions of the color filter substrate in different second exposure regions have different arrangement modes, and color filters in the display regions of the plurality of unit regions of the color filter substrate in a same second exposure region have a same arrangement mode; and cell-assembling the motherboard of the array substrate with the motherboard of the color filter substrate, such that the display regions of the unit regions of the array substrate on the motherboard of the array substrate align with the display regions of the unit regions of the color filter substrate on the motherboard of the color filter substrate in a direction perpendicular to the first base substrate or to the second base substrate.

It should be noted that there is no special limitation to the above steps of manufacturing the motherboard of the array substrate and the steps of manufacturing the motherboard of the color filter substrate. The motherboard of the array substrate may be manufactured before the steps of manufacturing the motherboard of the color filter substrate, or the motherboard of the color filter substrate may be manufactured before the steps of manufacturing the motherboard of the array substrate, or the motherboard of the array substrate and the motherboard of the color filter substrate may be manufactured simultaneously.

Following is a description of each step of the above methods with reference to some embodiments in greater detail.

In a course of the above manufacturing the motherboard of the array substrate, thin film patterns are formed in each exposure region on the first base substrate. The first base substrate can be a transparent substrate, such as a transparent glass substrate. The thin film pattern layer can have a plurality of layers, while the identification patterns can be located in one of the plurality of thin film pattern layers. In a course of manufacturing a plurality of thin film pattern layers, a plurality of different masks can be employed to manufacture each film pattern layer. Thus, the above masks can include a plurality of different masks for manufacturing a plurality of thin film pattern layers. Yet, as the thin film patterns in different exposure regions may be the same, these plurality of different masks can be used in the patterning process of a plurality of exposure regions sequentially, which is to say, different exposure regions can use the same set of masks.

Figure 1:
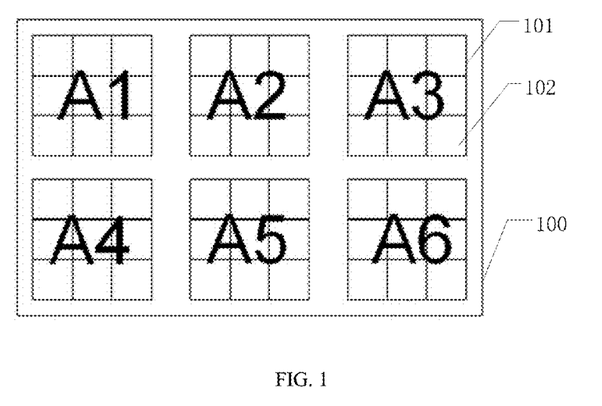
FIG. 1 is a schematic diagram of a base substrate for manufacturing a motherboard of an array substrate.

Firstly, a course of manufacturing an array substrate is given. Respective circuit patterns and thin film transistors are formed on the first base substrate. FIG. 1 schematically illustrates the first base substrate, i.e., a schematic diagram of a base substrate for manufacturing a motherboard of an array substrate. As illustrated in FIG. 1, a first base substrate 100 can be divided into six exposure regions 101, illustrated by six regions of A1, A2, A3, A4, A5 and A6 in the diagram. The division of exposure regions 101 is allowed according to a maximal region available for single exposure. In addition, each exposure region can be further divided into regions of the array substrate required to manufacture the unit display panels. For convenience, the regions are called as unit regions 102 of the array substrate. As illustrated in FIG. 1, each exposure region 101 includes nine unit regions 102 of the array substrate. Although it is described above with an example that each first base substrate includes six exposure regions and each exposure region includes nine unit regions of the array substrate, the quantity is not limited to the above according to the embodiments of the present disclosure, but can be subjected to free adjustment according to a size of the motherboard substrate, a condition of the exposure process, and a size of a final unit display panel to be prepared and other factors.

In the course of forming the array substrate, it is needed to regularly fabricate patterns of the TFT device and pixels on the base substrate. For example, the array process includes a cleaning technology, a chemical vapor deposition (CVD) film-forming technology, a sputtering film-forming technology, photoresist coating, a developing and stripping technology, an exposure technology, a dry etching technology, and so on, to finally form patterns of 4 to 5 layers of thin films on the glass substrate. The course of forming a pattern of each layer may include: cleaning, film-forming (for example, the sputtering mode for forming a film may be used for the metal, and the CVD mode for forming a film may be used for the nonmetal), coating photoresist on the substrate with film formed thereon, and exposing with the mask, transferring desired patterns from the mask to photoresist, forming the pattern of photoresist after developing, then etching the film layer to be patterned for the mask by using photoresist pattern, and lastly removing surplus photoresist. Taking the process of a pattern of five layers of thin films as an example, according to an order of forming the film, there may be a gate line process, an active layer process, a data process, a contact hole process and a pixel electrode process in sequence. The gate electrode and gate lines of a TFT are formed in the gate line process, the semiconductor pattern of an active layer used for the TFT is formed in the active layer process, source/drain electrode and data lines of the TFT are formed in the data process, a contact hole through which a pixel electrode is electrically connected with the drain electrode of the TFT is formed in the contact hole process, and the pattern of the pixel electrode is formed in the pixel electrode process. That is to say, the manufacturing course of the array substrate can include manufacturing of multiple layers of circuit patterns or other patterns, for example, include: patterns of the gate electrode of the thin film transistor, the gate lines, the active layer, the source-drain electrode of the thin film transistor, the data lines, and the pixel electrode and so on. According to the embodiment of the present disclosure, there is no special limitation to the order and specific structure of respective layers of the array substrate. The fabrication of a pattern of each layer of thin film can include processes such as preparation of film layer, coating of the photoresist, exposure, developing, etching as well as removing photoresist and so on, and any appropriate process can be selected from these processes, which is not specifically defined by the embodiments of the present disclosure.

The above processes are only some exemplary processes available to the embodiments of the present disclosure. The embodiments according to the present disclosure are not limited to the above specific fabrication processes, but can select any appropriate manufacturing process. For example, the manufacturing process of the array substrate can also include the manufacturing process of a common electrode in a liquid crystal display panel of plane electric field mode. When the gate lines are being manufactured, a process of manufacturing common electrode lines can be included. In addition, a process of forming an alignment layer and so on can be included.

Figure 2:
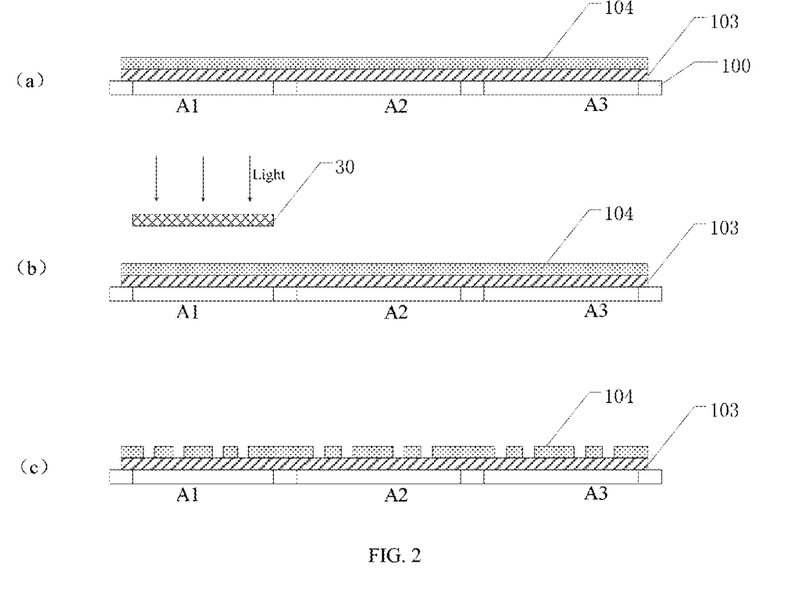
FIG. 2 is a schematic diagram of an exposure process in a patterning process for a film layer in an exposure region.

FIG. 2 illustrates a schematic diagram of an exposure process in a patterning process for a film layer in an exposure region. As illustrated in FIG. 2(a), a film layer 103 is formed on all the exposure regions A1-A6 (only A1-A3 are illustrated in a sectional view in FIG. 2) on the first base substrate 100, then a photoresist layer 104 is formed on the film layer 103. Firstly, the mask 30 is utilized to expose the first exposure region A1, then the mask 30 is used to expose the first exposure region A2, and expose the first exposure regions of A2, A3, A4, A5 and A6 sequentially, as illustrated in FIG. 2(b). After the exposure, the photoresist is subjected to the developing process to form a photoresist pattern, as illustrated in FIG. 2(c). After the photoresist pattern is formed, it can be used as an etching mask to etch the film layer 103 to form desired patterns. Besides, different masks can be employed for different film layer patterns. It should be noted that the above flows are likely to be repeated for many times as the array substrate needs a plurality of film layer patterns. And a detailed description is omitted here.

Figure 3:
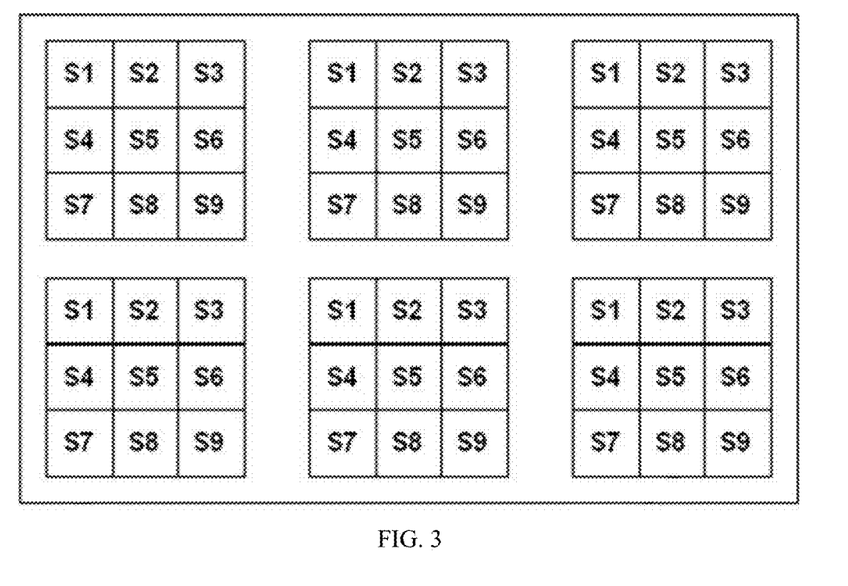
FIG. 3 is a schematic diagram of identification patterns on the motherboard of the array substrate.

In the above forming of patterns of multiple layers of thin films, any layer can be selected as a thin film pattern in which identification patterns are formed. For example, the above thin film pattern can include a gate electrode pattern layer and a source-drain electrode pattern layer. The identification patterns can be formed in any of the gate electrode pattern layer and the source-drain electrode pattern layer. Besides the identification patterns, the gate electrode pattern layer can include the gate electrode of the thin film transistor, and the gate lines. The source-drain electrode pattern layer can include the source/drain electrode of the thin film transistor, and the data lines. Besides, the identification patterns can be configured to be characters or other arbitrary shapes that can distinguish different unit regions of the array substrate in the same exposure region. For example, in the nine unit regions of the array substrate in each exposure region, the identification patterns can be S1, S2, S3, S4, S5, S6, S7, S8 and S9, respectively. As illustrated in FIG. 3, different unit regions of the array substrate are marked as S1, S2, S3, S4, S5, S6, S7, S8 and S9 in a same exposure region. Although FIG. 3 schematically illustrates that S1-S9 are located in the unit regions of the array substrate, an identification pattern only occupies a small area, for example, it can be arranged in the peripheral region of the display panel, which will be described later. Different unit regions of the array substrate in the same exposure region can be distinguished by the above identification patterns. Yet, it is known that although the above identification patterns can distinguish different unit regions of the array substrate in the same exposure region, it fails to distinguish the unit regions of the array substrate in different exposure regions. For example, the unit region S1 of the array substrate in the first exposure region A1 cannot be distinguished from the unit region S1 of the array substrate in the first exposure region A2. According to the embodiments of the present disclosure, for the unit display panels, the arrangement modes of color filters on the color filter substrate are used for distinguishing in addition to use of the above identification patterns for distinguishing. Following is a description of manufacturing a motherboard of a color filter substrate.

In the course of forming the motherboard of the color filter substrate, it is needed to form a series of color filter pattern arrays on the color filter substrate in a certain order. Black matrices can be used to separate adjacent color filters patterns, to avoid crosstalk between adjacent sub-pixels.

In the course of manufacturing the motherboard of the color filter substrate, corresponding to each exposure region on the array substrate, the second base substrate can be divided into a plurality of corresponding exposure regions. The color filters in different colors are formed by patterning in each exposure region.

For example, an exemplary method of forming color filters can refer to the following steps.

Figure 4:
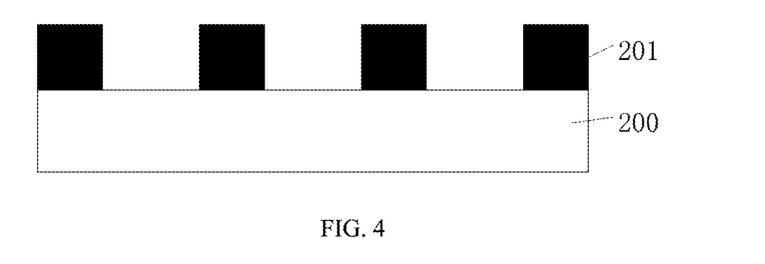
FIG. 4 and FIG. 5 are structural schematic diagrams of forming color filters.

Step 101 (as illustrated in FIG. 4): forming a black matrix 201 on the second base substrate 200, the black matrix 201 enclosing a pixel region. For example, a layer of black matrix material made from photoresist can be spin coated or scratch coated on the substrate, then the substrate is exposed by using a mask with patterns, and exposed substrate is developed to obtain a pattern of black matrices. For example, the thickness of the pattern of black matrices can be 1-5 µm. There is no limitation on the fabrication method of the black matrices, for example, the fabrication can also be conducted by vacuum evaporation coating.

Figure 5:
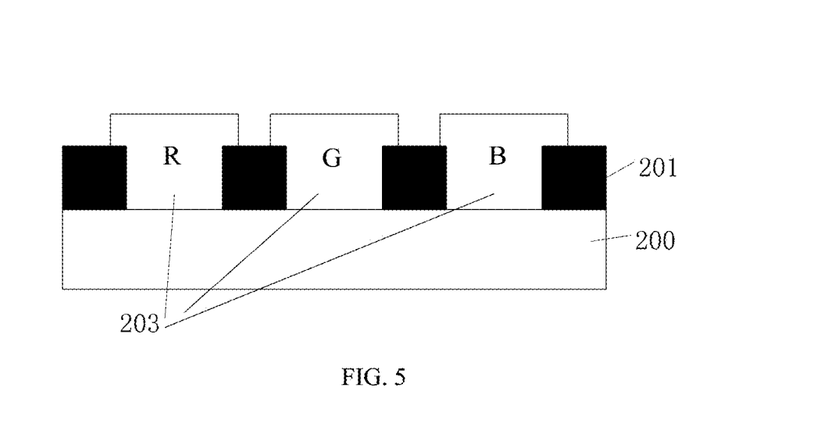

Step 102 (as illustrated in FIG. 5): forming a pixel resin layer between the black matrices 201, to form color filters 203. As the color filters 203 may include pixel resin layers in different colors, such as a red pixel resin layer, a green pixel resin layer, and a blue pixel resin layer, or a transparent pixel resin layer, the pixel resin layer of each color usually need to be formed separately. The thickness of the pixel resin layer can be 1.0 to 1.3 micrometers. Firstly, the solvent that is soluble with a pixel resin material is dispersedly added to the pixel resin material. In some examples, the solvent is a low-boiling solvent, having an atmospheric boiling point lower than 70° C., for example, ethanol, aether, pentane, acetone or chloroform can be employed. Then, the pixel resin material added with solvent is coated on the first base substrate with black matrices formed thereon. And then, heat treatment is performed on the base substrate coated with the pixel resin material to volatize the dispersed solvent in the pixel resin material. This heat treatment is just a prebaking step in the photoresist process. The heat treatment may have a temperature of 90-110° C. and a duration of 3-5 min. Then, the heat treated substrate is exposed using mask with patterns, to form the patterns of the pixel resin layer after developing and heat treatment. Repeat the above steps for the pixel resin layer in different colors to obtain a complete pixel resin layer. The method for manufacturing the pixel resin layer is not limited to the above examples, and a staining method, a printing method, an electro-deposition method and an ink-jet method can be used.

Furthermore, the course of manufacturing the motherboard of the color filter substrate can include a step of forming a passivation layer, which can be formed by processes of coating, baking, and so on. The passivation layer can be made from organic materials. Generally speaking, the passivation layer is transparent, with a function of protecting the pixel resin layer from abrasion, improving heat resistance and flattening a surface thereof. Besides, the course of manufacturing the motherboard of the color filter substrate can include a step of forming an alignment layer.

If the color filters in different colors are to be formed by patterning with the masks in each exposure region, the masks for forming the color filters in different colors in each exposure region can be the same, just needing to translate in a certain direction. Besides, the same masks can be used for different exposure regions. In the step of manufacturing the color filters in different colors, relative positions in corresponding exposure regions of the masks for forming the color filters in at least one color are different in different second exposure regions. For example, in one exposure region, there is a first distance between the mask for forming the color filter of one color and an edge of the exposure region; in another exposure region, there is a second distance between the mask for forming the color filter of this color and a corresponding edge of the another exposure region. In this way, the arrangement sequences of the red color filters, the green color filters and the blue color filters in each row of the array are different in different second exposure regions. For the exposure regions divided in the course of forming the motherboard of the color filter substrate and the mode of exposing sequentially with the masks, please refer to the description about the array substrate in FIGS. 1 and 2, and a detailed description is omitted here.

It should be noted that the exposure regions on the second base substrate can correspond to the plurality of exposure regions on the first base substrate one by one. In addition, each exposure region on the motherboard of the color filter substrate can also include a plurality of unit regions of the color filter substrate corresponding to the unit regions of the array substrate. The display regions in the unit regions of the color filter substrate on the second base substrate correspond to the display regions in the unit regions of array substrate in the first base substrate one by one. The word "correspond" refers to that the display regions of the unit regions of the array substrate on the motherboard of the array substrate can align with corresponding displays regions of the unit regions of the color filter substrate on the motherboard of the color filter substrate in a direction perpendicular to the first base substrate or the second base substrate after the motherboard of the array substrate and the motherboard of the color filter substrate are cell-assembled, such that the unit regions of the array substrate and the unit regions of the color filter substrate can be cut into the unit display panels.

Figure 6:
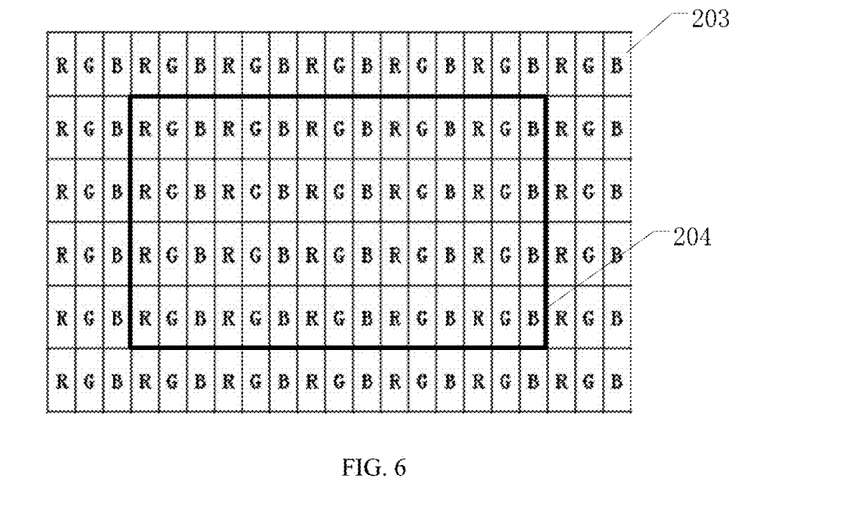
FIG. 6 to FIG. 11 illustrate schematically arrangements of color filters corresponding to one unit display panel in different exposure regions.
Figure 7:
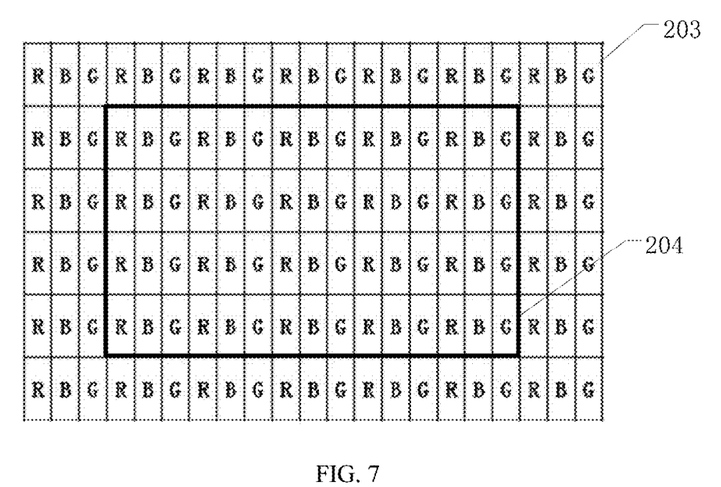
Figure 8:
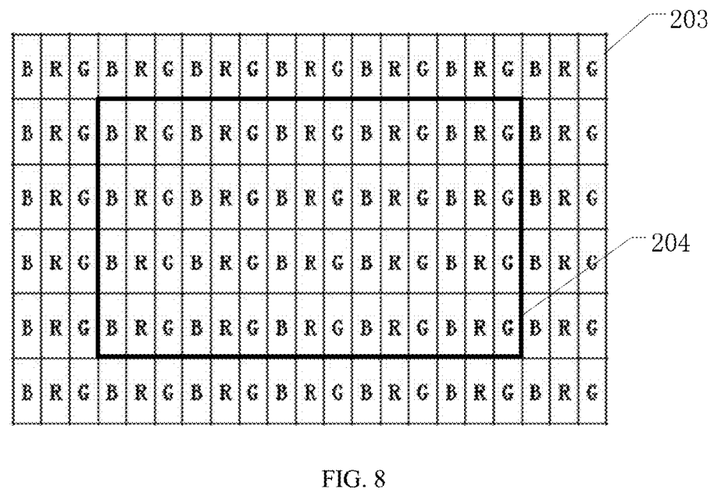
Figure 9:
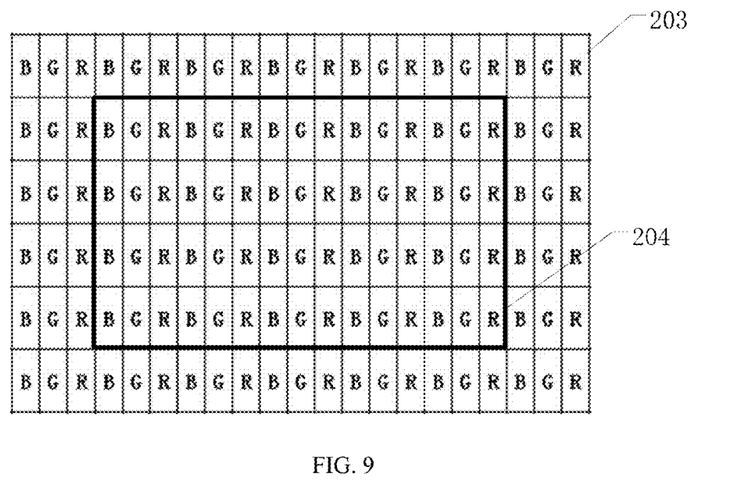
Figure 10:
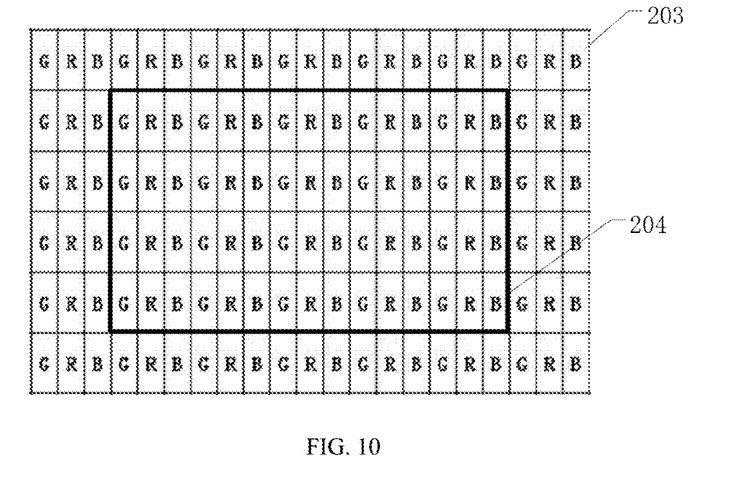
Figure 11:
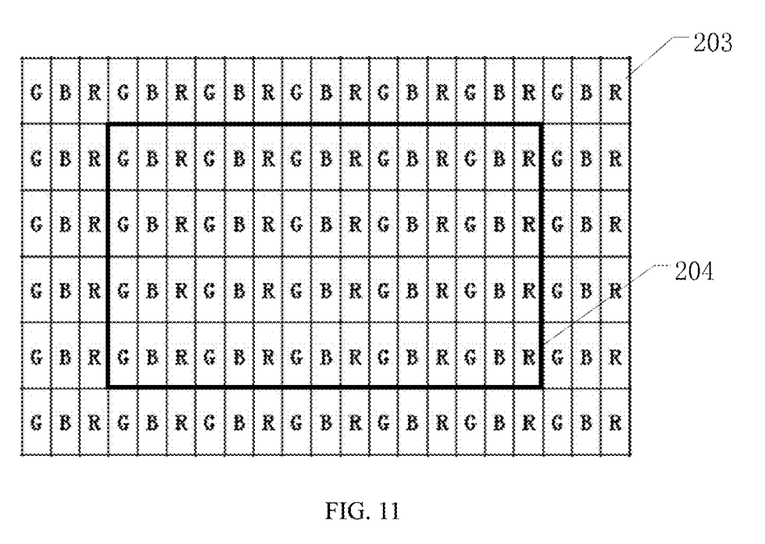

Take the red, green and blue color filters as example, the differences in the arrangement modes of the color filters in each exposure region are described with reference to the accompanying drawings. As illustrated in FIGS. 6-11, the arrangement of the color filters corresponding to one unit display panel in different exposure regions are illustrated schematically. In these accompanying drawings, the color filters 203 use "R", "G" and "B" to respectively represent the red, green and blue color filters; the heavy solid line boxes in the diagrams represent the display region 204 in the unit region of the color filter substrate. In FIG. 6, the color filters of three colors are repeatedly set with R, G, B as a unit from left to right in each row of the display region 204. In FIG. 7, the color filters of three colors are repeatedly set with R, B, G as a unit from left to right in each row of the display region 204. In FIG. 8, the color filters of three colors are repeatedly set with B, R, G as a unit from left to right in each row of the display region 204. In FIG. 9, the color filters of three colors are repeatedly set with B, G, R as a unit from left to right in each row of the display region 204. In FIG. 10, the color filters of three colors are repeatedly set with G, R, B as a unit from left to right in each row of the display region 204. In FIG. 11, the color filters of three colors are repeatedly set with G, B, R as a unit from left to right in each row of the display region 204. FIGS. 6 to 11 illustrate that the arrangement sequences of the three color filters are different. Thus, the color filter substrates produced in different exposure regions can be distinguished by the different arrangement sequences of color filters in the display region. The embodiments in the above FIGS. 6-11 take the color filters of three colors of R, G and B as an example. However, the embodiments according to the present disclosure are not limited to the above three colors and the arrangement sequence as illustrated in the diagrams, as long as the arrangement sequences of the color filters corresponding to the display regions in different exposure regions are different. Furthermore, it can be set that the arrangement sequences of color filters corresponding to the display regions are the same in a same exposure region.

Lastly, the manufactured motherboard of the array substrate and the motherboard of the color filter substrate are cell-assembled, such that the display regions of the unit regions of the array substrate on the motherboard of the array substrate align with the display regions of the unit regions of the color filter substrate on the motherboard of the color filter substrate in a direction perpendicular to the first base substrate or the second base substrate. For example, a side of the motherboard of array substrate having the thin film pattern layer formed and a side of the motherboard of the color filter substrate having the color filter formed face each other.

For example, the sealant is arranged between the motherboard of the array substrate and the motherboard of the color filter substrate, and the sealant surrounds the unit regions of the array substrate and the unit regions of the color filter substrate. In addition, a liquid crystal material can be applied in the display region between the motherboard of the array substrate and the motherboard of the color filter substrate. The embodiments of the present disclosure have no special limitation on the mode of applying the liquid crystal material, which can be applying the liquid crystal material to either of the motherboard of the array substrate or the motherboard of the color filter substrate before cell-assembling, or infusing the liquid crystal material between the motherboard of the array substrate and the motherboard of the color filter substrate after cell-assembling. For example, the liquid crystal material is applied to the display region enclosed by the sealant.

In the cell-assembled motherboard of the liquid crystal display panel, the region corresponding to the unit display panels in the motherboard of array substrate (the unit regions of the array substrate) and the region corresponding to the unit display panels in the color filter substrate (the unit regions of the color filter substrate) face each other. In addition, in the display regions of the unit display panels, the motherboard of the color filter substrate of different exposure regions form the arrangement mode with different color filters, while the motherboard of the array substrate includes the identification patterns arranged in the peripheral region of each unit display panel region. The identification patterns are configured to distinguish a plurality of unit regions of the array substrate in each exposure region. Thus, in the motherboard of the liquid crystal display panel, the different exposure regions are distinguished by the arrangement modes of the color filters of the display regions in each unit display panel, while in the same exposure region, the identifications formed on the array substrate are used for distinguishing. Then, each unit display panel produced on the same motherboard can be distinguished.

According to some embodiments of the present disclosure, a motherboard of a liquid crystal display panel is further provided, including a motherboard of an array substrate and a motherboard of a color filter substrate which are cell-assembled with each other, and a liquid crystal material located between the motherboard of the array substrate and the motherboard of the color filter substrate, wherein the motherboard of the liquid crystal display panel includes a plurality of first regions; each first region includes a plurality of unit display panel regions; the unit display panel region includes a display region and a peripheral region; the motherboard of the array substrate includes identification patterns arranged in the peripheral region of each unit display panel region, the identification patterns are configured to distinguish the plurality of unit regions of the array substrate in each first region; the motherboard of the color filter substrate includes an array of color filters in different colors, color filters located in different first regions have different arrangement modes, and color filters in the unit display panel region in a same first region have a same arrangement mode.

For example, the motherboard of the array substrate includes a plurality of film pattern layers, and the identification patterns are arranged in one of the plurality of film pattern layers.

For example, the plurality of thin film pattern layers include a gate electrode pattern layer and a source-drain electrode pattern layer, and the identification patterns are included in one of the gate electrode pattern layer and the source-drain electrode pattern layer.

For example, the array of color filters in different colors includes red color filters, green color filters, and blue color filters. The arrangement sequences of the red color filters, the green color filters and the blue color filters in each row of the array of color filters are different in different first regions.

For example, sealant is arranged between the motherboard of the array substrate and the motherboard of the color filter substrate, and the sealant surrounds the display regions of the unit display panel regions.

For example, a liquid crystal material is located in the display region surrounded by the sealant between the motherboard of the array substrate and the motherboard of the color filter substrate.

Further, for other structures of the motherboard of liquid crystal display panel, please refer to the description about manufacturing the liquid crystal display panel according to the embodiments of the present disclosure. And a detailed description is omitted here.

In addition, each unit display panel can be divided to form independent unit display panels after the above motherboard of the liquid crystal display panel is manufactured. In the manufactured unit display panels, there are the identification patterns distinguishing different unit display panels formed in the above same exposure region on the array substrate, and the arrangement sequences of the color filters in different colors on the color filter substrate are different. Thus, it can be distinguished which position the unit display panel is from. And, for other detailed structures of the segmented unit display panels (i.e., liquid crystal display panels), the description about manufacturing the motherboard of the liquid crystal display panel according to the embodiments of the present disclosure can also be referred to. And a detailed description is omitted here.

Figure 12:
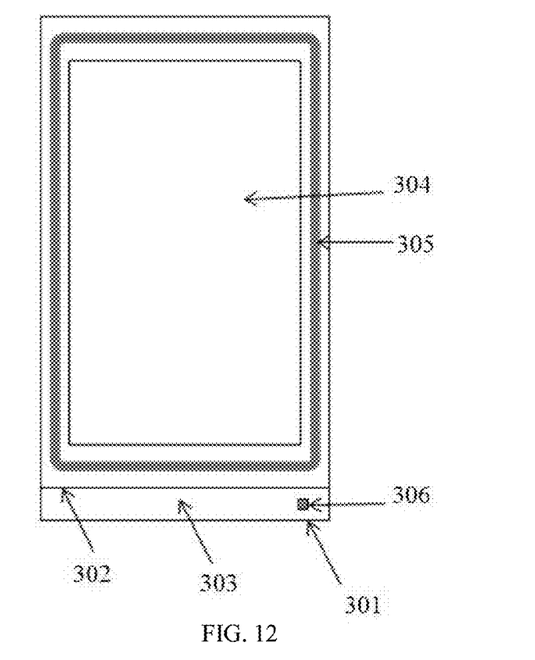
FIG. 12 and FIG. 13 are structural schematic diagrams of a separate unit display panel being cut.
Figure 13:
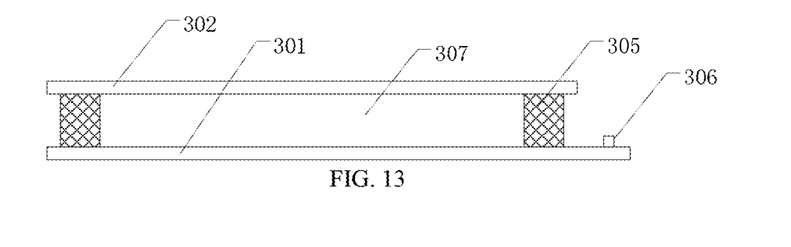

FIGS. 12 and 13 are structural schematic diagrams of a separate unit display panel being cut. For the purpose of concision, FIGS. 12 and 13 only schematically illustrate some parts of the liquid crystal display panel. As illustrated in FIGS. 12 and 13, the unit display panel includes an array substrate 301 and a color filter substrate 302 which are cell-assembled. A liquid crystal material 307 can be arranged between the array substrate 301 and the color filter substrate 302. The display panel includes a display region 304 and a peripheral region 303 in a periphery of the display region 304. For example, part of the color filter substrate corresponding to the peripheral region 303 can be cut to expose the peripheral region 303. The identification pattern 306 is the identification pattern on the above array substrate. The identification pattern 306 can be arranged in the peripheral region 303 of the array substrate. For example, the identification pattern 306 can be arranged in a rectangular region of 1 square millimeter, for example, a rectangular region of 1 mm×1 mm. In the conventional identification patterns, it is needed to record different exposure regions and the regions of different unit display panels of different exposure regions and other information, and thus, a desired area is large. For example, the conventional identification patterns may occupy an area of 1 mm×10 mm. Thus, according to the embodiments of the present disclosure, the area occupied by the identification patterns can be significantly decreased, conducing to enabling a display device with narrower frame.

The foregoing embodiments merely are exemplary embodiments of the present disclosure, and not intended to define the scope of the present disclosure, and the scope of the present disclosure is determined by the appended claims.

The invention claimed is:

1. A method for manufacturing a liquid crystal display panel, comprising:
   preparing a first base substrate, the first base substrate being divided into a plurality of first regions, each first region including a plurality of first sub-regions for manufacturing an array substrate of a unit display panel, each first sub-region including a display region and a peripheral region located a periphery of the display region; forming a film pattern layer in each first region of the first base substrate by a patterning process with a mask, to form a motherboard of an array substrate, the film pattern layer including identification patterns located in the peripheral regions of the first sub-regions, and the identification patterns being configured to distinguish the plurality of sub-regions of each first region;
   preparing a second base substrate, the second base substrate being divided into a plurality of second regions corresponding to the plurality of first regions of the first base substrate, each second region including a plurality of second sub-regions corresponding to the plurality of first sub-regions, each second sub-region including a display region corresponding to the display region of the first sub-region; forming an array of color filters in different colors in each second region to form a motherboard of a color filter substrate, such that color filters in the display regions of the second sub-regions in different second regions have different arrangement modes, and color filters in the display regions of the plurality of sub-regions of a same second region have a same arrangement mode; and
   cell-assembling the motherboard of the array substrate with the motherboard of the color filter substrate, such that the display regions of the first sub-regions on the motherboard of the array substrate align with the display regions of the second sub-regions on the motherboard of the color filter substrate in a direction perpendicular to the first base substrate or to the second base substrate.

2. The method for manufacturing the liquid crystal display panel according to claim 1, wherein the first region and the second region are exposure regions capable of being covered by a single exposure process.

3. The method for manufacturing the liquid crystal display panel according to claim 1, wherein forming the film pattern layer in each first region of the first base substrate by the patterning process with the mask includes: patterning with different masks to form a plurality of thin film pattern layers sequentially, the identification patterns being included in one of the plurality of thin film pattern layers.

4. The method for manufacturing the liquid crystal display panel according to claim 3, wherein the plurality of thin film pattern layers include a gate electrode pattern layer and a source-drain electrode pattern layer, the identification patterns are included in one of the gate electrode pattern layer and the source-drain electrode pattern layer.

5. The method for manufacturing the liquid crystal display panel according to claim 1, wherein the array of color filters in different colors includes red color filters, green color filters, and blue color filters, and arrangement sequences of the red color filters, the green color filters and the blue color filters in each row of the array are different in different second regions.

6. The method for manufacturing the liquid crystal display panel according to claim 5, wherein in the step of manufacturing color filters in different colors, the color filters in different colors are formed by patterning processes with a same mask, and relative positions in corresponding second regions of masks for forming color filters in at least one color are different in different second regions, such that arrangement sequences of the red color filters, the green color filters and the blue color filters in each row of the array of color filters are different in different second regions.

7. The method for manufacturing the liquid crystal display panel according to claim 1, wherein cell-assembling the motherboard of the array substrate with the motherboard of the color filter substrate includes arranging sealant between the motherboard of the array substrate and the motherboard of the color filter substrate, and the sealant surrounding the first sub-regions and the second sub-regions.

8. The method for manufacturing the liquid crystal display panel according to claim 1, further comprising dividing the first sub-regions of the motherboard of the array substrate and the second sub-regions of the motherboard of the color filter substrate which are cell-assembled, to form the unit display panels.

9. The method for manufacturing the liquid crystal display panel according to claim 1, further comprising applying a liquid crystal material between the motherboard of the array substrate and the motherboard of the color filter substrate.

10. The method for manufacturing the liquid crystal display panel according to claim 1, wherein each of the identification patterns is arranged in a rectangular region of 1 square millimeter.

* * * * *